(12) United States Patent
Hiltunen et al.

(10) Patent No.: US 6,533,844 B1
(45) Date of Patent: Mar. 18, 2003

(54) METHOD AND ASSEMBLY FOR SEPARATING SOLIDS FROM GASEOUS PHASE (75) Inventors: Jyrki Hiltunen, Sipoo (FI); Isto Eilos, Porvoo (FI); Vesa Niemi, Porvoo (FI)

(73) Assignee: Fortum Oil and Gas Oy, Espoo (FI)

( * ) Notice: Subject to any disclaimer, the term of this patent is extended or adjusted under 35 U.S.C. 154(b) by 0 days.

(21) Appl. No.: 09/762,683

(22) PCT Filed: Aug. 12, 1999

(86) PCT No.: PCT/FI99/00671
§ 371 (c)(1),
(2), (4) Date: Apr. 11, 2001

(87) PCT Pub. No.: WO00/09242
PCT Pub. Date: Feb. 24, 2000

(30) Foreign Application Priority Data

Aug. 12, 1998 (FI) .................................................. 981743

(51) Int. Cl.⁷ ............................................. B01D 45/12
(52) U.S. Cl. .............................. 95/271; 55/345; 55/419; 55/457
(58) Field of Search .......................... 55/343, 345, 419, 55/457; 95/271

(56) References Cited

U.S. PATENT DOCUMENTS

| 1,897,195 | A | * | 2/1933 | Howden ..................... 209/723 |
| 3,885,933 | A |   | 5/1975 | Putney |
| 4,546,709 | A |   | 10/1985 | Astrom |
| 5,665,949 | A |   | 9/1997 | Fusco et al. |
| 6,022,390 | A | * | 2/2000 | Jakkula ..................... 55/345 |

FOREIGN PATENT DOCUMENTS

| DE | 910381 | 5/1954 |
| GB | 1401331 | 9/1972 |
| WO | A1-9925469 | 5/1999 |

* cited by examiner

*Primary Examiner*—Robert A. Hopkins
(74) *Attorney, Agent, or Firm*—Birch, Stewart, Kolasch & Birch, LLP (57) ABSTRACT

The invention relates to a method for separating materials of two different phases from one another and an assembly for implementing the method. According to one embodiment of the invention, the second phase having the material in suspended or dispersed form is separated from the first phase by centrifugal force. At least one separator comprises a multiport cyclone into which the material flow is passed via an infeed nozzle having an annular cross section.

25 Claims, 4 Drawing Sheets

PRIOR ART

Fig. 4

METHOD AND ASSEMBLY FOR SEPARATING SOLIDS FROM GASEOUS PHASE

This application is the national phase under 35 U.S.C. §371 of PCT International Application No. PCT/FI99/00671 which has an International filing date of Aug. 12, 1999, which designated the United States of America.

BACKGROUND OF THE INVENTION

The invention relates to separation of two phases from each other, as well as an assembly suited for implementing said method. In particular, the invention concerns a method according to the preamble of claim 1 for separating solids and/or liquids from gas flows or, respectively, for separating solids from liquid flows. According to the present method, a gas-phase flow carrying, e.g., a catalyst or other solids or a liquid phase is passed to a separating means, wherein the other phase is then separated from said gas phase under the effect of a centrifugal force. To separate solids from a liquid-phase flow, the liquid flow is passed in a similar manner to a separating apparatus, wherein the solids are separated from the liquid under the effect of a centrifugal force.

The invention also relates to an apparatus according to the preamble of claim 15, suitable for separating solids and/or liquids from gas/liquid flows in fluidized-bed equipment.

Embodiments of highest commercial value used for separating two phases from each other are fluidized-bed reactors. Generally, fluidized-bed reactors are employed in the hydrocarbon conversion processes and energy generation. In these apparatuses a catalyst or similar solids-containing material capable of improving heat transfer or material fluidization is kept in a fluidized state by means of a gas-phase hydrocarbon or flue gas flow. Subsequently, the solids are separated from the gas flow by means of a cyclone.

The most generally used fluidized-bed reactor is a bubbling-bed reactor in which the linear flow velocity of the fluid medium is typically from 5 to 10 times the minimum fluidization velocity that can maintain the main portion of the solids in the fluidized bed of the reactor, whereby no significant amount of the solids can escape the reactor along with the hydrocarbon and flue gas flow. The term minimum bubbling velocity is defined as the linear gas flow velocity at which a portion of the gas flow begins to pass through the bed in the form of bubbles. This minimum bubbling velocity is dependent on the properties of the fluidizing gas and the solids involved.

When the gas flow velocity is increased above the minimum bubbling velocity, the top of the fluidized bed becomes less defined, in fact, being transformed into a gradient zone in which the solids content decreases upstream. At sufficiently high flow velocities, a fluidized flow is achieved in which practically all particulate solids are entrained in the gas flow that keeps up the fluidized state. Then, the solids separated by cyclones from the gas flow must be returned to the bottom part of the reaction space in order to maintain the mass balance unchanged.

As mentioned, the method and assembly according to the invention can be used, e.g., in processes employed for treating hydrocarbons. Examples of such processes include catalytic and thermal cracking, dehydrogenation, Fischer-Tropsch synthesis, manufacture of maleic acid anhydride and oxidizing dimerization of methane.

An application of the fluidized-bed reactor commonly used in energy generation is a boiler in which the fluidized material such as sand and/or solid fuel particles are fluidized with the combustion air flow and the flue gas released in the process. Also a liquid- or gas-phase fuel can be used. Circulating fluidized-bed (CFB) reactors of both the bubbling fluidized-bed and the entrained fluidization technique are conventionally used in the art. In these, the solids and unburnt particles are removed from the flue gas flow by means of cyclones. In this context, the term entrained fluidization refers to fluidization which takes place in both the turbulent fast fluidization range as well as the pneumatic transport range.

Hydrocarbon conversion processes are run using fixed-bed reactors and fluidized-bed reactors (fluidized catalytic reactors). In the present context, the term "fluidized catalytic process equipment" is used to refer to equipment used in processes having a fine-grained pulverized catalyst suspended, e.g., in a slowly upward rising gas flow, wherein the catalyst promotes the occurrence of desired reactions.

One of the most widely employed fluidized-catalyst reactor systems in the art is the FCC equipment, that is, fluidized-catalyst cracking equipment, comprising chiefly a riser pipe acting as a reactor operated in the fast-fluidization flow state and a regenerator operated in the dense-phase bubbling bed state.

In fluidized-bed reactors, the particulate matter of the suspended solids and the product gas are separated from each other in cyclones utilizing the effect of the centrifugal force. Typically, a number of cyclones must be connected in series along the gas flow in order to improve the overall collection efficiency, because single cyclones of normal construction exhibit inferior separation capability for particles smaller than 15 $\mu$m. Herein, a cyclone is rated effective if it can separate these small-diameter particles from the gas flow.

In addition to applications related to fluidized-bed reactors, cyclones are also used for, e.g., separating liquid droplets in steam systems, solids from flue gases of drying processes, phase separation on two-phase flows (demister equipment), separation of solids from gases (dust separators) and as hydrocyclones serving in the coarse separation of solids from waste waters.

Cyclone separators have either a coiled or spiralled structure in which the particulate matter suspension is directed as a tangential flow into the cylindrical section of the cyclone, whereby the catalyst particles are driven apart from the gas to a close distance of the cyclone inner wall when the flow typically circulates about 7–9 revolutions within the cylindrical section of the cyclone and the conical section forming a continuation thereof. Also axial cyclones are known in which the gas flowing through a pipe is forced into a circulating motion by means of vanes, whereby the solids under the centrifugal force are driven against the pipe wall and separated thereon from the gas flow.

The most common cyclone type is a single-port spiralled cyclone called the Zenz cyclone, in which the proportions of the different parts of the cyclone are standardized, thus permitting the dimensioning of the cyclone to be based on graphs and computational formulas. The collection efficiency of this cyclone can be enhanced by a large number of flow revolutions in the cyclone chamber, high flow rate at the inlet nozzle, higher density of solids, narrower inlet nozzle port and lower viscosity of the gas.

In the preseparation cyclone of a fluidized-catalyst cracking unit, tests have shown the gas residence time to be in the order of 1.0–2.0 s from the riser top to the cyclone outlet, after which the catalyst will further stay in the separation vessel at an elevated temperature for 5–40 s. During this time, valuable compounds will be lost as a consequence of thermal reactions. Resultingly, gasoline products will be converted by thermal cracking into combustible gases, particularly hydrocarbons of the $C_2$ type. Other byproducts of thermal reactions are dienes, such as butadienes, which in the alkylation unit cause a significant increase in the acid consumption. Pentadienes in turn are particularly reactive, whereby their detrimental effect is evidenced as a reduced oxidation resistance of FCC gasoline. Further problems hampering the use of conventional FCC units are related to their poor control of reaction time and the erosion of the catalytic particles/circulating solids and the reactor structures.

The problems are mostly related to such essential parts of the equipment as the separation units of gases from solids/catalysts, that is, cyclones, which in most cases are implemented as single-port units. Herein, the term single-port cyclone refers to a cyclone construction having only one inlet nozzle for feeding the gas flow into the cyclone. To achieve the desired through-flow capacity, a plurality of these units are generally connected in parallel and then two or three in series.

In addition to being complicated and expensive, conventional cyclone constructions require a large footprint. Furthermore, the interior space of the cyclones must be lined with a ceramic compound to prevent erosion.

It is an object of the invention to overcome the disadvantages described above and to provide an entirely novel type of method and assembly for separating solids from a gas flow.

The goal of the present invention is attained by replacing at least one of the conventional cyclones of a fluidized catalytic process with a cyclone having multiple inlet openings (also known as a multi-inlet cyclone or a multiport cyclone), or alternatively, with a plurality of such multiport cyclones connected in series in a number of one or more. Herein, the term multiport cyclone is used to make reference to cyclone constructions having at least two, preferably at least 4 to 8 inlet ports for directing the gas flow to impact on the internal wall of the cyclone as an essentially tangential flow. The collection efficiency of a multiport cyclone can be made higher at low flow speeds and its structure is simpler and cheaper than that of conventional cyclones. Also the footprint required by the multiport cyclone is smaller.

A multi-inlet cyclone is mentioned the first time in a patent publication filed by E. I. Du Pont de Nemours and Company in 1974 (U.S. Pat. No. 3,969,096). Cited patent publication describes a cyclone separator having multiple-vaned gas inlet openings, said cyclone serving to separate suspended solid particles from internal combustion engine (in a car) exhaust gases.

However, E. I. Du Pont de Nemours and Company fails to present in the patent publication a theory capable of explaining why a multiport cyclone has a good collection efficiency at a low pressure drop. According to their hypothesis, the inlet guide vanes direct the incoming gas flow into the cyclone separator in sheetlike streams close to the inner wall of the cyclone shell, whereby the entrained particles need to travel a shorter distance prior to separation. Furthermore, the inventors assume that said sheets of inlet streams form a cleaner mass boundary between the downward and upward spiralling inlet streams, whereby the flow has a reduced tendency to form eddies. As stated in the application, reducing the eddy formation decreases the velocity-slowing drag on the inbound stream thus increasing the separating efficiency.

SUMMARY OF THE INVENTION

The separator equipment, or cyclones, used in the present invention comprise a cyclone chamber having an at least essentially upright aligned center axis and an advantageously essentially circular cross section of its internal space, whereby the separation chamber is rotationally symmetrical with respect to its center axis. To the separation chamber is connected an infeed nozzle of process gases, said nozzle having an essentially circular cross section centered about the center axis of the chamber. Further, the separation chamber includes a center pipe arranged therein for removal of gases and a downward return leg for the recovery of solids separated from the gas phase. The separation chamber is equipped with a set of guide vanes forming a louver which forces the gas to be treated into a stream circulating close to the inner wall of the cyclone chamber, thus effecting the separation of solids from the gas phase under the effect of the centrifugal force.

Advantageously, the assembly is comprised of cylindrical shells placed co-axially within each other, whereby the intershell channels with annular cross-section act as the fluidization space and the downward return leg of the reactor. The catalyst or solids are separated from the gas-phase suspension exiting the reactor by means of a multiport cyclone adapted immediately above the axially annular intershell flow channel.

Herein, the term "solids" refers to the material forming the suspension in the reaction space. Typically, the solids consist of catalyst particles if the reactor is employed in catalytic reactions. When the reactor is used in physical or thermal processes, the solids may be either inert particulate matter serving to transfer beat or material into the reaction space or out therefrom, or alternatively, particles of a solid fuel. The catalyst is selected according to the process being run.

The multiport cyclone is advantageously connected to the upper part of the reaction space. The material to be treated in the cyclone is passed via multiple inlet openings into the cyclone chamber. The infeed openings can be located symmetrically or asymmetrically about the center axis of the cyclone. Advantageously, the openings are disposed symmetrically, and the riser space is given an annular cross section, whereby the flow is homogeneous over the entire cross section of the flow channel. In this case, the cyclone is equipped with flow guide vanes serving to the force the flow into the spiral motion required for the centrifugal separation. Typically, the guide vanes are adapted in a circularly louvered fashion about the perimeter of the cyclone chamber interior wall so as to form a louver comprising a plurality of parallel inlet channels for the entering gas flow. Thus, the infeed nozzle of a multiport cyclone comprises means for deflecting the infeed flow that enters the cyclone radially. Such means may be formed by, e.g., guide vanes adapted to the upper part of the cyclone so that at least some portion of the vane area deflecting the impinging flow causes the flow to assume an essentially high velocity component directed toward the cyclone center axis thus serving to direct the gas stream from the perimeter of the cyclone toward the center of the cyclone.

In a CYMIC circulating bed boiler developed by Kvaerner Pulping Oy (formerly Tampella Power Oy), such a multiport cyclone is used to remove entrained particles of the fluidized bed material from the flue gases and to return the particulate matter back to the boiler. The cyclone is disposed in the interior space of the boiler and is cooled with water.

It is possible to adapt a second multiport cyclone in the interior space of a first multiport cyclone or, alternatively, of a conventional cyclone, too, inasmuch the gas flow in the cyclone is symmetrical thus permitting the distribution of flow in a symmetrical manner to the guide vane system of the secondary cyclone. This kind of arrangement offers advantageous flow and construction properties, because the lower concentration of catalyst in the secondary cyclone permits the latter cyclone to be operated at a higher flow velocity than the preceding upstream cyclone. Depending on the available factory space and collection efficiency, a desired number of cyclones can be connected in series.

In a preferred embodiment of the invention, the infeed nozzle of essentially annular cross section used according to the invention for distributing the gases to be treated is implemented so that the means for deflecting the radially entering gas flow are extended in the radial direction outside the exterior perimeter of the cyclone. Furthermore, in a particularly advantageous embodiment of the invention, said means, such as the infeed nozzle comprising the guide vane system extends in the exterior space of the cyclone from the top level of the cyclone downward along the outer perimeter of the cyclone shell. Then, the portion of the guide vane system located on the outside surface of the cyclone and directed downward on the same can be adapted to direct the flow entering the cyclone in the upward direction from the preceding cyclone that surrounds the said cyclone. Flow direction in the present context is used for making reference to, e.g., flow guidance, stabilization and/or deflection. The guide vane system may also be placed only partially inside the inlet channel or, alternatively, entirely or only partially inside the cyclone.

In a preferred embodiment of the invention, the downward return legs of the concentrically adapted cyclones are placed in a similar manner co-axially. In a further preferred embodiment of the invention having at least two multiport cyclones adapted concentrically, the cyclones are advantageously designed so that the guide vane system of any inner cyclone is always located above the guide vane system of the respectively upstream preceding outer cyclone.

Accordingly, the goal of the invention is attained by adapting at least one multiport secondary cyclone inside a primary cyclone or another preceding secondary cyclone.

More specifically, the method according to the invention is characterized by what is stated in the characterizing part of claim 1. Furthermore, the assembly according to the invention is characterized by what is stated in the characterizing part of claim 15.

The present invention provides significant benefits. Accordingly, the equipment construction according to the invention, which is based on the use of a multiport cyclone, gives significant advantages in flow dynamics and process engineering over conventional arrangements and generally used single-port cyclones. This is because of the fact that in conventional single-port cyclones, the solids flow impinges on the cyclone inner wall as a homogeneous gas-suspended jet of high flow velocity which in primary cyclones is typically in the range 20–25 m/s, in secondary cyclones about 35 m/s, and in tertiary cyclones about 40 m/s. The flow rate of the impinging jet must be high, because the cyclone inlet nozzle width (et width) is generally, e.g., in standardized Zenz cyclones about one-fourth of the cyclone diameter, and the particulate matter must be brought over the entire width of the impinging jet close to the cyclone inner wall in order to achieve separation of the solids from the gas flow. In this type of cyclone, the point most susceptible to erosion is the area of the cyclone inner wall receiving the jet impact of the suspended catalyst particles.

By contrast, in the construction according to the invention, the erosion problems are eliminated by improved flow dynamics: the conventional single large-volume inlet flow of solids is divided into a plurality of smaller-volume mass flows impinging on the internal wall of the multiport cyclone, whereby the erosive effect is distributed over a larger area. By virtue of the multiport construction, the cyclone inlet ports can be made narrow, whereby the catalyst layer becomes shallow, and the flow velocity at any inlet port may be essentially smaller than in conventional single-port cyclones in which reduction of the inlet port width would require an increased channel height, resulting in a higher cyclone and requiring an infeed channel of an elongated and clumsy shape. The possibility of using a reduced cyclone inlet flow velocity contributes to a further lowered erosion rate, which according to published references is dependent on the flow velocity by a power of 4 to 5.

In tests carried out at room temperature, a cyclone according to the invention with 465 mm diameter with full-area inlet ports and straight vanes has demonstrated a collection efficiency of 99.99% at 5.6 m/s inlet flow velocity when the cross-sectional mass flow rate of the catalyst according to differential pressure measurements was over 200 kg/m$^2$s. In a conventional Zenz cyclone with compatible dimensions and flow rates, the collection efficiency was 99.10% as computed by particle size fractions. A comparison of these collection efficiencies makes it clear that the novel cyclone with multiple narrow inlet ports according to the invention offers a superior efficiency when the design goal is to avoid high flow velocities leading to erosion.

In a preferred construction according to the invention having the reactor riser pipe (hereafter, shortly a riser) connected directly to the cyclone inlet pipe, an accurately controllable residence time is achieved, because the catalyst is made to enter the cyclone from each point of its infeed pipe simultaneously. Hence, a cyclone according to the invention can be designed for a volume about half of that of a standard cyclone. By placing the cyclones concentrically inside one another, the valuable interior volume of the cyclone pressure vessel can be reduced as compared to arrangements having the cyclones placed in a parallel or superimposed manner in the interior space of the pressure vessel. Since a cyclone according to the invention may have a shorter construction owing to its improved flow dynamics, its height and, respectively, retention time can be, e.g., halved from the corresponding values of a standard cyclone. Resultingly, the possibility of undesired thermal reactions is reduced. Moreover, the product can be cooled directly in the discharge pipe of the cyclone if so required.

According to a first preferred embodiment of the invention, the multiport cyclone is used for separating catalyst from the product gases of a fluidized catalytic cracking (FCC) process. The multiport cyclone may also be employed in the regenerator equipment of an FCC unit for separating the regenerated catalyst from the coke combustion gases.

Other suitable fluidized catalytic processes are, among others: catalytic reforming, oxidizing dimerization of phthalic acid anhydride, maleic acid anhydride or methane, Fischer-Tropsch synthesis, chlorination and bromination of methane, ethane and other hydrocarbons, and conversion of methanol into olefines or gasoline.

Separation of solids is carried out using a plurality (e.g., 2–10, most appropriately 2–5) of cyclones connected in series. By virtue of their structure, the cyclones used in the invention, of which at least one is a multiport cyclone, can be adapted concentrically inside one another, e.g., so that the downward return leg of the any one cyclone in the downstream series of cyclones is adapted to the interior of the downward return leg of the preceding cyclone. Owing to the longitudinally-stacked coaxial placement of the cyclones within the pressure shell, a significant volume reduction is attained with respect to conventional cyclone constructions requiring side-by-side placement of the cyclones. A multiport cyclone can be made with a larger diameter than a conventional cyclone; the diameter of multiport cyclones may be over one meter, even up to several meters, whereas the diameter of a conventional cyclone is generally limited to 1 m maximum. Yet, the diameter of the reaction vessel need not be increased in the embodiment according to the invention, but instead, may even be made smaller.

The cyclone infeed nozzle can be formed from the intershell space remaining between two concentrically adapted cylindrical or partially conical envelope surfaces, whereby said annular space may be divided into parallel flow segments by means of axially extending baffles. The parallel flow segments can be implemented by mounting longitudinally aligned baffles radially between the two coaxial, cylindrical envelope surfaces. Almost an equivalent result is obtained by constructing the infeed nozzle with the annular cross section from a set of parallel infeed channel tubes mounted equidistantly spaced in a circular fashion.

The guide vanes of the cyclone are adapted in a circularly louvered fashion about the perimeter of the cyclone chamber wall, partially or entirely inside the riser channel so as to form a louver comprising a plurality of parallel inlet channels for the entering gas flow.

The cyclone(s) according to the invention either is/are connected directly to the riser channel (shortly, riser) of a fluidized catalytic process reactor, which is a preferred embodiment of the invention, or alternatively, the infeed nozzle(s) of the cyclone(s) is/are adapted to communicate with the gas space of a fluidized catalytic process reactor as is the case with conventional arrangements.

In a preferred embodiment of the invention having the means, which are provided for deflecting the flow entering the cyclone in a radial direction, arranged to extend radially outward to the outer space of the cyclone, the flow can be controlled effectively already prior to its entry into the cyclone. Moreover, in a particularly advantageous embodiment of the invention, in which said means extend downward from the top level of the cyclone, the flow control effect may be further augmented and the flow control started earlier than in conventional constructions. Resultingly, it is possible to control efficiently and at an early stage the flow which leaves the vortex zone of the preceding outer cyclone and is directed upwards. Owing to the efficient flow control arrangement, the flow can be passed in a desired state of flow into the inner cyclone, unaffected by any possible irregularities in the flow pattern of the outer cyclone. Furthermore, the powerful flow control effect exerted by the guide vane system, particularly in its upright portion outside the inner cyclone, facilitates an exceptionally good degree of preseparation between the outer and inner cyclones of the separator assembly.

As the inlet flow to the inner cyclone may already initially have a tangential velocity component, it may be advantageous not to extend the guide vanes up to the outer edge of the inlet channel of the inner cyclone.

A further benefit is gained therein that the upright deflecting or guiding means adapted on the outer perimeter of the cyclone, said means comprising a tubular outer envelope for forming a gas flow channel in the intershell space between said outer envelope and said outer perimeter of said inner cyclone, facilitates an advantageous concentric placement of the multiport cyclones inside one another so that the guide vane system of each successively inner cyclone is located above guide vane system of the respectively preceding outer cyclone. Herein, it is easy to realize a construction in which the downward return leg of the inner cyclone contains a column of solids column extending higher than the solids column formed in a similar manner from the separated product solids in the downward return leg of the outer cyclone. The solids column must be maintained if the pressure in the interior space of the cyclone is lower than the ambient pressure about the bottom end of the cyclone downward return leg. Respectively, the height difference between the tops of the solids columns is necessary in order to compensate for the difference between the pressure levels in the interior spaces of the cyclones when the bottom ends of the cyclone downward return legs exit in the same space. The pressure difference between the interior spaces of the cyclones is principally created by the pressure drops occurring in the guide vane systems or similar deflecting means as well as by the pressure losses occurring in the flow channels and due to the changes of the flow velocity. The pressure difference is compensated for through the different hydrostatic pressures over solids columns of different heights accumulated in the downward return legs of the cyclones. In this manner, the return of the solids to the cyclone bed can be implemented using the embodiment described above.

Next, the invention will be examined with the help of exemplifying embodiments by making reference to the appended drawings in which.

BRIEF DESCRIPTION OF THE DRAWINGS

EXAMPLE 1

Figure 1A:
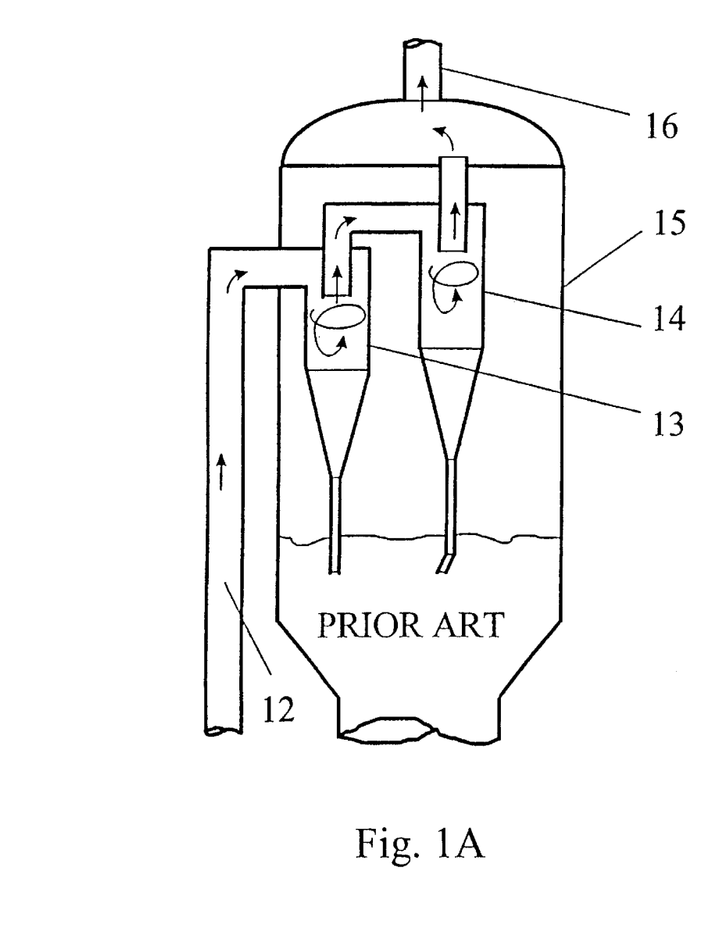
FIG. 1A shows a prior-art cyclone.
Figure 1B:
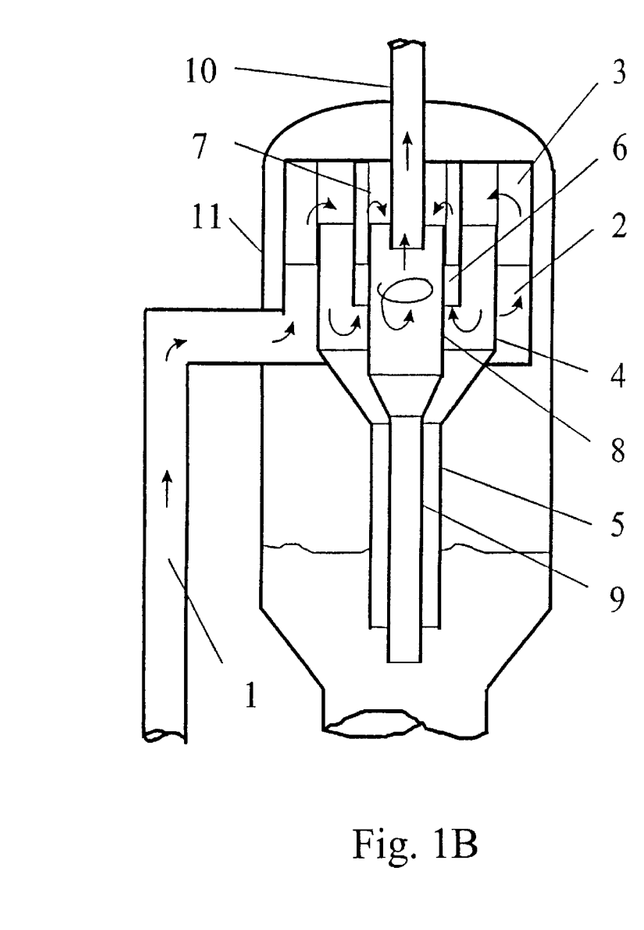
FIG. 1B shows a first embodiment of a cyclone according to the invention.
Figure 2A:
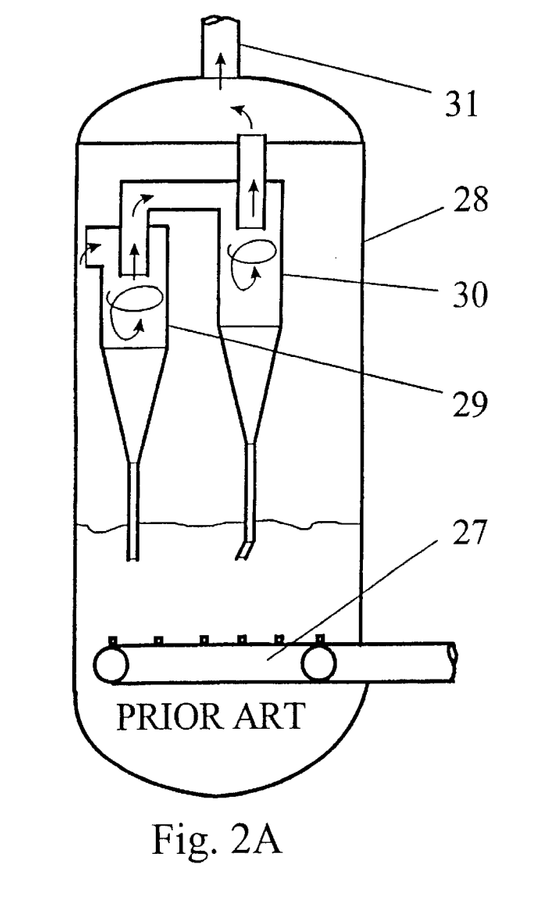
FIG. 2A shows a prior-art cyclone.
Figure 2B:
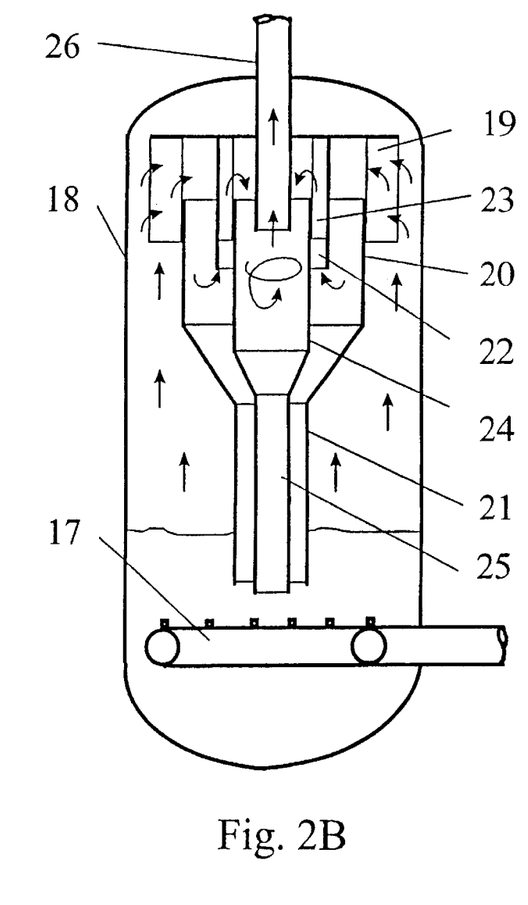
FIG. 2B shows a second embodiment of a cyclone according to the invention.

In FIGS. 1B and 2B is shown a first and a second preferred embodiment of the invention suitable for use in conjunction with a fluidized-bed catalytic cracking unit, FCC. The FCC unit includes two reactors, one reactor of the circulating fluidized bed type and a bubbling fluidized-bed regenerator. Conventional constructions used for the same purpose are illustrated in FIGS. 1A and 2A.

FCC Reactor

In FIG. 1B is shown a cyclone construction according to the invention, while FIG. 1A shows a conventional cyclone arrangement having two cyclones (primary and secondary cyclones) connected in series directly to the riser of an FCC reactor. Obviously, the number of cyclones in the series connection may be greater or smaller than two.

Function of Prior-art Cyclone Arrangement

The mixture of the prefluidization gas with the evaporated phase of reacted and still reacting hydrocarbon is passed in gas phase upward along a riser 12, whereby the entrained catalyst is carried to a primary cyclone 13 adapted to the interior space of the reactor vessel 15. The solids are separated from the gas phase on the walls of the reactor chamber and fall therefrom into the downward return leg of the primary cyclone 13. From the return leg, the catalyst is transported forward into a hydrocarbon separation section and a regenerator. The gas flow entering the primary cyclone 13 exits the cyclone 13 via its center pipe into a secondary cyclone 14. The particulate matter is separated from the gas by impinging on the chamber walls, then falling therefrom into the return leg of the secondary cyclone 14. From the secondary cyclone 14, the gas passes into a possible collection chamber and is discharged from the reactor vessel 15 via an outlet nozzle 16.

Cyclone Assembly According to the Invention and its Function

In the assembly shown in FIG. 1B, a reactor 11 comprises a primary cyclone and a secondary cyclone plus a riser 1 for passing the reaction mixture flow into the primary cyclone and a discharge pipe 10 for passing the gas flow out from the secondary cyclone and discharging the same from the entire reactor assembly 11. The primary cyclone includes an annular space 2 formed to the upper end of the riser 1 in the interior space of a reactor 11, a guide vane system 3 adapted at least to the upper part of said annular space 2 with a chamber 4 situated below said guide vane system for forcing the reaction mixture flow passing via said guide vane system 3 into a vorticously rotating flow that sweeps along the interior wall of said chamber 4 and a downward return leg 5 connected to the lower part of said chamber 4.

The secondary cyclone is adapted to the interior space of the primary cyclone and comprises a center pipe 6 that forms an axially annular flow channel and passes the gas flow introduced into the primary cyclone from the primary cyclone to the secondary cyclone, a guide vane system 7 connected to said axially annular flow channel formed by said center pipe 6 and a chamber 8 connected to said guide vane system 7, all of these components serving to force the gas flow entering said secondary cyclone into a vorticously rotating motion that sweeps along the interior wall of said chamber 8. The secondary cyclone also includes a return leg 9 that extends downward from said chamber 8 and is advantageously disposed co-axially in the interior space of said return leg 5 of said primary cyclone.

In the operation of the above-described assembly, the mixture of the prefluidization gas with the evaporated phase of the reacted and still reacting hydrocarbon is passed in gas phase upward along a riser 1, whereby the entrained catalyst is carried with the gas to an annular space 2 adapted to the interior space of the reactor 11, wherefrom it further rises upward to the guide vane system 3 of the primary cyclone. The guide vane system 3 serves to induce a vorticous flow in which the entrained particles are separated from the gas phase by impinging under the centrifugal force on the interior wall of the chamber 4 and falling therefrom into the downward return leg 5 of the primary cyclone. From the return leg 5, the catalyst travels further into a hydrocarbon separation section and a regenerator. The gas flow entering the primary cyclone leaves the cyclone via the center pipe 6, wherefrom the flow rises further along the channel of annular cross section into the guide vane system 7 of the secondary cyclone. The particles are separated from the gas phase by impinging on the interior wall of the cyclone chamber 8 and falling therefrom into the downward return leg 9 of the secondary cyclone. The return leg 9 of the secondary cyclone is advantageously adapted into the interior space of the primary cyclone return leg 5. The gas flow passed into the secondary cyclone leaves the cyclone and the reactor 11 via an outlet nozzle 10.

FCC Regenerator

In FIG. 2A is shown a conventional cyclone construction and FIG. 2B shows a cyclone assembly according to the invention, respectively, both arrangements having two cyclones (a primary cyclone and a secondary cyclone) connected in series in the interior space of an FCC regenerator vessel. The number of series-connected cyclones may be varied so as to be either greater than two or, alternatively, comprising only one cyclone or a plurality of parallel-connected cyclones. Since a conventional cyclone can have a diameter of about 1 m maximum, generally more than one of such conventional cyclones must be connected in parallel depending on the.

Conventional Cyclone Arrangement

Herein, the inlet air which is passed through a bottom grate 27 fluidizes the catalyst contained in the regenerator 28 in a bubbling-bed condition and simultaneously imports oxygen to the coke combustion reaction. The gas with the suspended catalyst particles is next passed into a primary cyclone 29 adapted to the interior space of a regenerator 28. The particulates of the flow are separated from the gas phase by impinging on the interior wall of the separation chamber and falling therefrom into the downward return leg 29 of the primary cyclone. From the return leg, the catalyst travels further back into the fluidized bed. The gas flow entering the primary cyclone 29 leaves the cyclone 29 via the center pipe passing into a secondary cyclone 30. The particles are separated from the gas phase by impinging on the interior wall of the cyclone chamber and falling therefrom into the downward return leg of the secondary cyclone 30. From the secondary cyclone 30, the gas flow passes further into a collection chamber and finally leaves the reactor via an outlet nozzle 31.

Cyclone Assembly According to the Invention and its Function

In the assembly shown in FIG. 2B, a regenerator 18 comprises a primary cyclone and a secondary cyclone as well as a grate 17 for passing air into the regenerator 18 and a discharge nozzle 26 for passing the gas flow out from the secondary cyclone and simultaneously from the entire regenerator 18. The primary cyclone includes a guide vane system 19 adapted at least to the upper part of the cyclone chamber in the interior space of the regenerator 18 and a chamber 20 situated below said guide vane system 19, said guide vane system 19 serving to force the gas flow entering the chamber into a vorticously rotating flow that sweeps along the interior wall of said chamber. The primary cyclone also includes a downward return leg 21 connected to the lower part of said chamber 20.

The secondary cyclone is adapted to the interior space of the primary cyclone and comprises a center pipe 22 that forms an axially annular flow channel and passes the gas flow introduced into the primary cyclone from the primary cyclone to the secondary cyclone, a guide vane system 23 connected to said axially annular flow channel formed by said center pipe 22, and a chamber 24 connected to said guide vane system 23, all of these components serving to force the gas flow entering said secondary cyclone into a vorticously rotating motion that sweeps along the interior wall of said chamber 24. The secondary cyclone also includes a return leg 25 that extends downward from said chamber 24 and is advantageously disposed co-axially in the interior of said return leg 21 of said primary cyclone.

In the operation of the above-described assembly, the inlet air passed through a bottom grate 17 fluidizes the catalyst contained in the regenerator 18 in a bubbling-bed condition and simultaneously imports oxygen to the coke combustion reaction. The gas flow with the suspended catalyst particles rises into a guide vane system 19 formed in the interior space of the primary cyclone. The function of the guide vane system 19 is to induce a vorticous flow in which the particles are separated from the gas phase by impinging under the centrifugal force on the interior wall of the chamber 20 and falling therefrom into the downward return leg 21 of the primary cyclone. From the return leg 21, the catalyst is passed back into the fluidized bed. The gas flow entering the primary cyclone leaves the cyclone via the center pipe 22, wherefrom the flow rises further along the channel of an annular cross section into the guide vane system 23 of the secondary cyclone. The particles are separated from the gas phase by impinging on the interior wall of the cyclone chamber 24 and falling therefrom into the downward return leg 25 of the secondary cyclone. The return leg 25 of the secondary cyclone is advantageously adapted into the interior space of the primary cyclone return leg 21. From the secondary cyclone, the gas flow leaves the cyclone and the regenerator via an outlet nozzle 26.

EXAMPLE 2

Figure 3A:
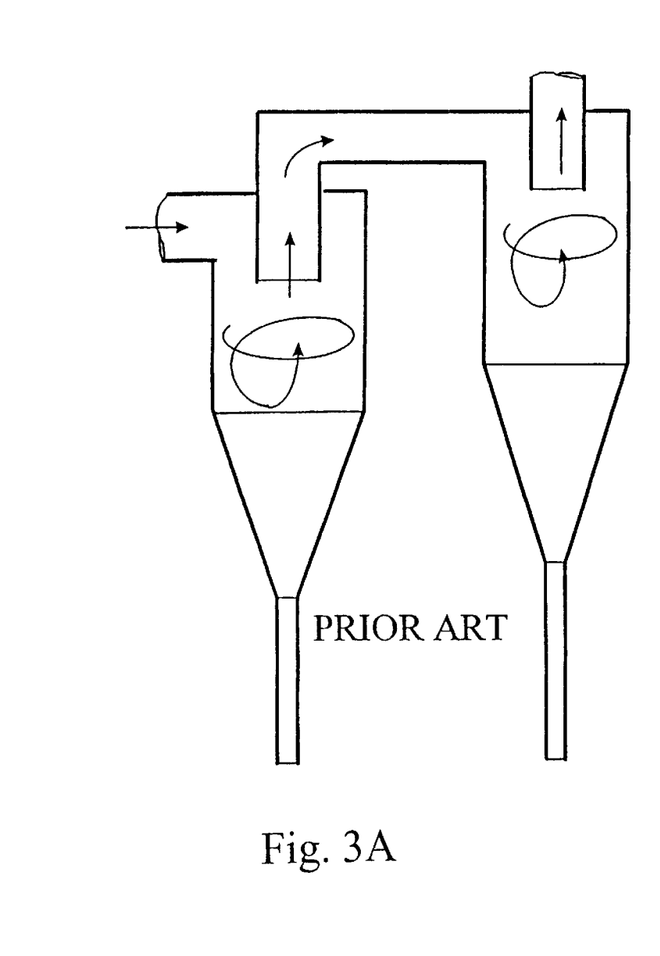
FIG. 3A shows a prior-art cyclone.
Figure 3B:
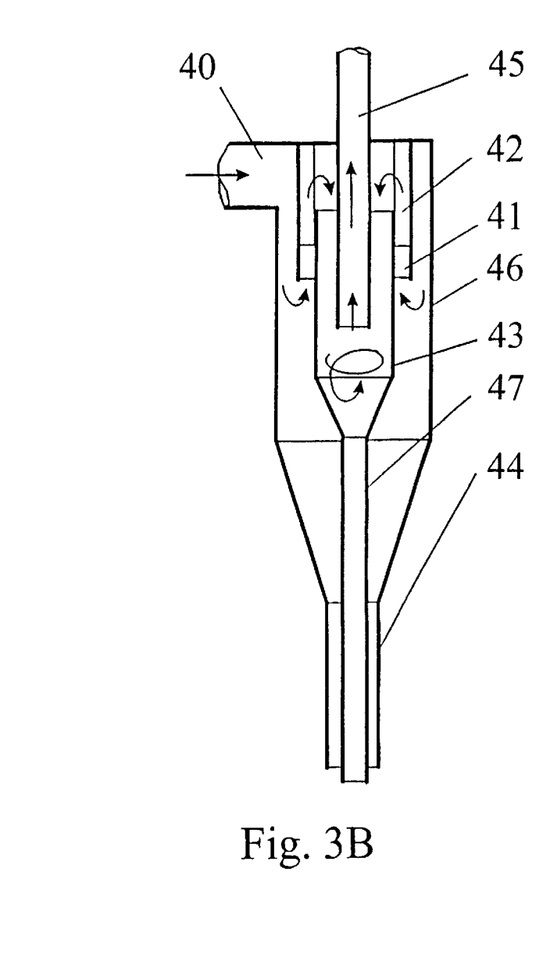
FIG. 3B shows a second embodiment of a cyclone according to the invention.

This example elucidates the use of a multiport cyclone in conjunction with a conventional single-port cyclone. FIG. 3A shows a conventional connection between a primary and a secondary cyclone. Respectively, FIG. 3B shows a connection according to the invention in which the multiport cyclone is adapted entirely to the interior space of the single-port cyclone. The adaptation of the multiport cyclone inside the single-port cyclone is made possible by the symmetrical distribution of gas flow in the interior space of the cyclone, thus permitting the flow to be divided symmetrically to the guide vane system of the secondary cyclone.

The assembly shown in FIG. 3B comprises a single-port primary cyclone chamber 46, a nozzle 40 passing the reaction mixture flow into said cyclone chamber 46, a return leg 44 extending downward from said cyclone chamber 46 and a multiport secondary cyclone adapted to the interior space of said cyclone chamber 46. The secondary cyclone comprises a center pipe 41, a guide vane system 42 connected to said center pipe 41, a cyclone chamber 43 following said guide vane system 42 in the downstream direction of the gas flow, a return leg 47 extending downward from said cyclone chamber 43 and a discharge nozzle 45 extending upward from said cyclone chamber 43.

Figure 4:
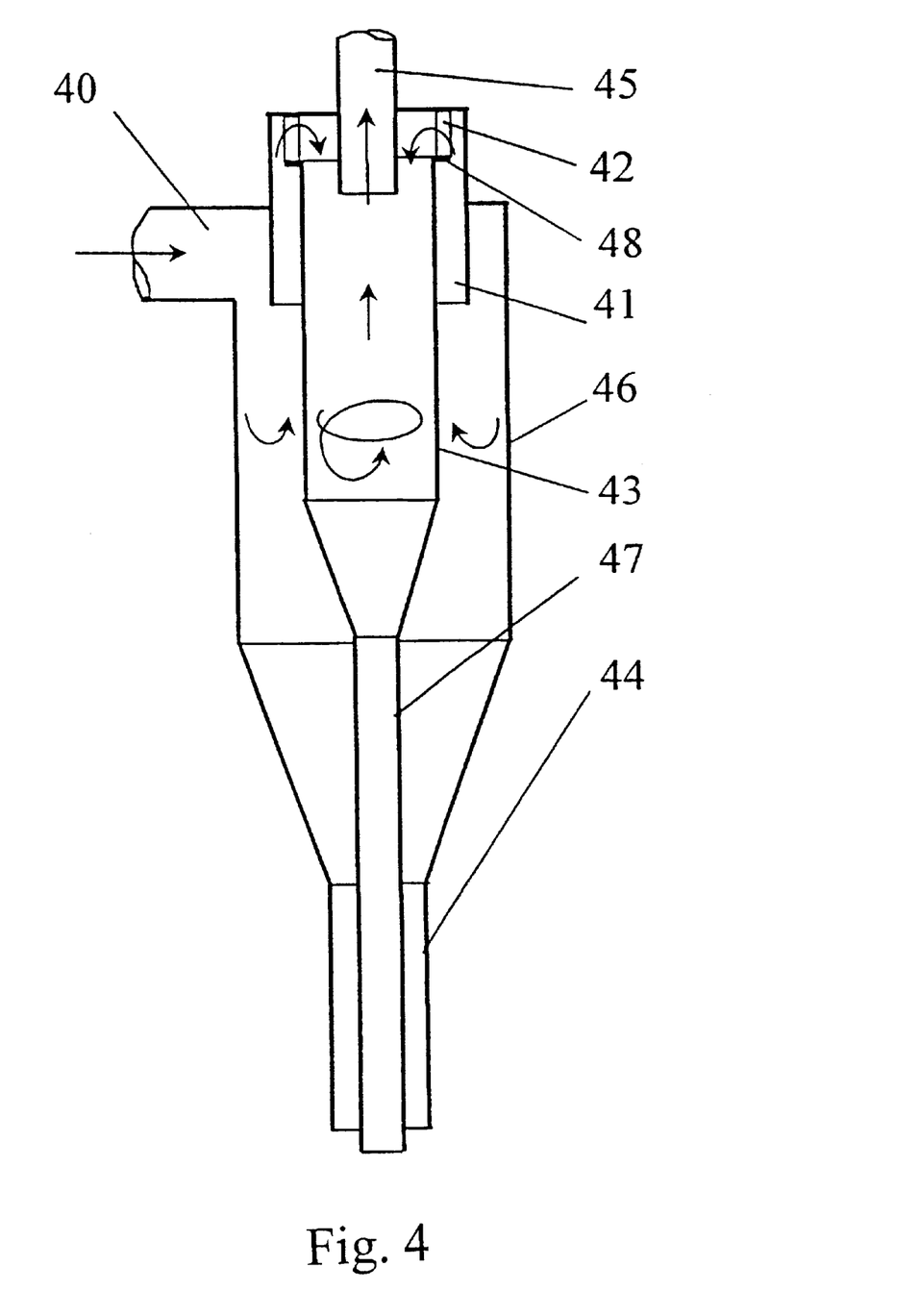
FIG. 4 shows an embodiment of a cyclone according to the invention assembled so that a higher hydrostatic pressure difference can be created between the inner and the outer cyclone than that occurring in the embodiment of FIG. 3B. Furthermore, the guide vane system herein is adapted to extend only partially into the interior of the inlet channel, whereby the tangential velocity component imposed by the primary cyclone on the flow can be utilized.

While the assembly shown in FIG. 4 is otherwise similar to that of FIG. 3B, herein the secondary cyclone is adapted partially above the primary cyclone so that a higher hydrostatic pressure difference can be provided between the solids columns contained in the return leg 44 and the return leg 47.

Furthermore, the secondary cyclone guide vane system 42 extends only partially to the interior of the center pipe 41.

What is claimed is:

1. A method for separating two phases from each other, said method comprising passing a material flow of a process, which material flow contains material in a first phase and material in a second suspended or dispersed phase, into first separating means and, subsequently, into at least second separating means, wherein the material in the suspended or dispersed phase is separated from the material in the first phase under the effect of a centrifugal force, and at least one unit of the second separating means is a multiport cyclone which is adapted inside the first separating means and into which cyclone the material flow to be treated is fed via an infeed nozzle having an annular cross section, wherein a multiport cyclone is used as said first separating means and wherein the material flow to be treated is a liquid flow containing solids to be removed.

2. Method according to claim 1, characterized in that a plurality of series-connected cyclones are used for separating the material of said second phase from the material of said first phase.

3. Method according to claim 2, characterized in that therein are used from 2 to 5 series-connected cyclones having the downward return leg of any one cyclone in the downstream series of cyclones adapted to the interior of the downward return leg of the preceding cyclone.

4. A method according to claim 1, wherein downward return legs of at least two successive series-connected cyclones are adapted to discharge the solids being separated into a common space.

5. Method according to claim 4, characterized in that the compensation of the pressure difference between the interior spaces of the cyclones connected successively in series and adapted to return their solids fraction into the same space is accomplished by way of maintaining solids columns of different heights in the downward return legs of said cyclones.

6. Method according to claim 1, characterized in that the material flow is passed into said multiport cyclone via said infeed nozzle so that the flow entering the interior space of the multiport cyclone from the exterior of the cyclone is guided and deflected with the help of deflecting means adapted to said infeed nozzle so as to be located entirely or at least partially to the exterior side of the cyclone.

7. A method according to claim 1, wherein the material flow is passed into said multiport secondary cyclone so that the flow is directed to travel upward from a primary cyclone toward a top edge of the secondary cyclone with the help of deflecting and/or guiding means adapted to the exterior surface of the secondary cyclone, said deflecting and/or guiding means including a tubular guiding element that may contain guide vane members for guiding and deflecting the upright travelling flow.

8. Method according to claim 7, wherein the material flow is passed from said multiport primary cyclone into said multiport secondary cyclone so that with the help of deflecting and/or guiding means adapted to the exterior surface of the secondary cyclone, the flow is directed to travel from below first guide vane means of said primary cyclone to second guide vane means of said secondary cyclone that is located above the first guide vane means of said primary cyclone.

9. An assembly for separating a liquid and/or solids from a material flow in fluidized catalytic process equipment, said assembly comprising:

first and second separating means, each having an essentially upright aligned separating chamber (4, 8; 20, 24;

43, 46), said second separating means being adapted inside said first separating means, a first infeed nozzle (1; 17; 40) of the material flow to be separated, said first infeed nozzle being connected to said first separating means;

an outlet nozzle (10; 26; 45) connected to said second separating means for discharging the flow of the separated material from said separating means, and said second separating means being provided with a guide vane system (3, 7; 19, 23; 42) serving to force the material flow to be treated into a vorticously rotating motion that sweeps along the interior wall of said separating chamber (4, 8; 20, 24; 43) in order to separate the liquid and/or solids from the material flow under the effect of a centrifugal force, wherein:

said first separating means is a multiport cyclone; and
said guide vane system includes an upright portion outside an inner cyclone, the upright portion extending downward from a top level of the inner cyclone to provide flow control at an early stage.

10. Assembly according to claim 9, characterized in that the cross section of each separating chamber (4, 8; 20, 24; 43, 46) is essentially circular as taken at right angles to the vertical center axis of inner wall of the chamber.

11. Assembly according to claim 9, characterized in that said guide vane system (3, 7; 19, 23; 42) comprises radially outward oriented baffles which are adapted about the upright center axis of said separating chamber (4, 8; 20, 24; 43) so as to divide the passageway of the material flow being treated to said separating chamber (4, 8; 20, 24; 43) into parallel segmental flow channels.

12. An assembly according to claim 11, wherein said parallel segmental flow channels are formed by spanning radial baffle plates between two concentrically mounted cylindrical shells, said baffle plates being aligned parallel to the longitudinal axis of a reactor space.

13. An assembly according to claim 9, wherein at least said second separating means adapted inside said first separating means comprises a plurality of second infeed nozzles (2, 6; 22; 41) of essentially annular cross section for feeding said material flow into said guide vane system (3, 7; 23; 42) and therefrom further into said separating chamber (4, 8; 20, 24; 43).

14. An assembly according to claim 13, wherein said plurality of second infeed nozzles (2, 6; 22; 41) of essentially annular cross section are formed by parallel infeed channel tubes equidistantly spaced in a circular fashion.

15. An assembly according to claim 9, wherein said first separating means includes a guide vane system (3, 7; 19, 23; 42) serving to force the material flow to be treated into a vorticously rotating motion that sweeps along the interior wall of said separating chamber (4, 8; 20, 24; 43) in order to separate the liquid and/or solids from the material flow under the effect of a centrifugal force.

16. An assembly according to claim 9, which includes at least one additional separating means mounted inside said second separating means.

17. An assembly according to claim 9, wherein said first separating means and said second separating means mounted inside said first separating means have downward return legs adapted co-axially inside one another, thus serving to return separated solids from each of said separating means into a common collection space.

18. Assembly according to claim 17, characterized in that the return leg of any inner separating means in the vertical direction is adapted to extend higher than the top edge of the respectively concentrically closest preceding outer separating means.

19. Assembly according to claim 9, characterized in that the guide vane system of said separating means is adapted at least partially to the exterior side and above of said separating means so as to extend in the radial direction from the exterior side of said separating means so far inward as to reach the interior space of the separating means.

20. An assembly according to claim 9, wherein said assembly includes deflecting and/or guiding means, said deflecting and/or guiding means including a tubular guiding element that is connected at least to the guide vane system (3, 7; 19, 23; 42) of said second separating means and is adapted to enclosingly surround the outer surface of said second separating means in a downward oriented manner, said deflecting and/or guiding means serving to direct the material flow being treated in the upright direction from the bottom section of outer separating means to the guide vane system of the respectively subsequent inner separating means.

21. Assembly according to claim 20, characterized in that said deflecting and/or guiding means comprises guide vane members adapted to said guiding means for guiding and deflecting the upright travelling flow.

22. An assembly according to claim 9, said assembly having at least two concentrically mounted multiport cyclones as said first and second separating means, respectively, wherein a guide vane system of each successively inner multiport cyclone is adapted above a guide vane system of the respectively preceding outer multiport cyclone.

23. A method for separating two phases from each other, said method comprising passing a material flow of a process, which material flow contains material in a first phase and material in a second suspended or dispersed phase, into first separating means and, subsequently, into at least second separating means, wherein the material in the suspended or dispersed phase is separated from the material in the first phase under the effect of a centrifugal force, and at least one unit of the second separating means is a multiport cyclone which is adapted inside the first separating means and into which cyclone the material flow to be treated is fed via an infeed nozzle having an annular cross section, wherein a multiport cyclone is used as said first separating means, wherein the material flow to be treated is a gas flow containing solids in suspended form discharged from a boiler used in energy generation as a flue gas from which particulate matter must be removed.

24. A method for separating two phases from each other, said method comprising passing a material flow of a process, which material flow contains material in a first phase and material in a second suspended or dispersed phase, into first separating means and, subsequently, into at least second separating means, wherein the material in the suspended or dispersed phase is separated from the material in the first phase under the effect of a centrifugal force, and at least one unit of the second separating means is a multiport cyclone which is adapted inside the first separating means and into which cyclone the material flow to be treated is a gas flow containing solids in suspended form, the gas flow further containing an exhaust gas of a drying process from which particulate matter must be removed, and said material flow is fed via an infeed nozzle having an annular cross section, wherein a multiport cyclone is used as said first separating means.

25. A method for separating two phases from each other, said method comprising passing a material flow of a process, which material flow contains material in a first phase and material in a second suspended or dispersed phase, into first separating means and, subsequently, into at least second separating means, wherein the material in the suspended or dispersed phase is separated from the material in the first phase under the effect of a centrifugal force, and at least one unit of the second separating means is a multiport cyclone which is adapted inside the first separating means and into which cyclone the material flow to be treated is a gas flow containing solids in suspended form, said gas flow further containing an exhaust steam of a steam system from which liquid droplets are removed, and said material flow to be treated is fed via an infeed nozzle having an annular cross section, wherein a multiport cyclone is used as said first separating means.

* * * * *